US008167982B2

(12) United States Patent
Deubler et al.

(10) Patent No.: US 8,167,982 B2
(45) Date of Patent: May 1, 2012

(54) DRYER UNIT FOR COMPRESSED AIR AND OTHER GASEOUS MEDIA

(75) Inventors: Alfred Deubler, Freiberg (DE); Valeriu Fischer, Boennigheim (DE)

(73) Assignee: Beko Technologies GmbH (DE)

( * ) Notice: Subject to any disclaimer, the term of this patent is extended or adjusted under 35 U.S.C. 154(b) by 0 days.

(21) Appl. No.: 12/686,730

(22) Filed: Jan. 13, 2010

(65) Prior Publication Data

US 2010/0107879 A1 May 6, 2010

Related U.S. Application Data

(62) Division of application No. 11/663,216, filed as application No. PCT/EP2005/010424 on Sep. 27, 2005.

(30) Foreign Application Priority Data

Sep. 27, 2004 (DE) .......................... 10 2004 047 216
Oct. 1, 2004 (DE) .......................... 10 2004 048 438

(51) Int. Cl.
*B01D 53/22* (2006.01)
*B01D 50/00* (2006.01)
*B01D 45/12* (2006.01)

(52) U.S. Cl. ............... 96/8; 96/4; 96/10; 96/11; 96/416; 96/417; 95/45; 95/52; 55/320; 55/337; 55/428; 55/437; 55/DIG. 17

(58) Field of Classification Search ............... 95/45, 52; 96/4, 8, 10, 11, 414, 416, 417; 55/315.2, 55/318, 320, 337, 428, 430, 437, DIG. 17
See application file for complete search history.

(56) References Cited

U.S. PATENT DOCUMENTS

| 5,750,024 | A | * | 5/1998 | Spearman ..................... 210/315 |
| 6,019,822 | A | | 2/2000 | Kanzawa et al. |
| 6,296,683 | B1 | | 10/2001 | Koch |
| 6,485,535 | B1 | * | 11/2002 | Linnersten et al. ............. 55/337 |
| 2003/0010205 | A1 | * | 1/2003 | Bikson et al. ..................... 95/52 |
| 2004/0074386 | A1 | * | 4/2004 | Nichols et al. .................... 95/52 |
| 2005/0247619 | A1 | | 11/2005 | Berger et al. |

FOREIGN PATENT DOCUMENTS

| DE | 10 2004 022 312 A1 | 9/2005 |
| JP | 10-235134 A1 | 12/1998 |
| JP | 11-33338 | * 2/1999 |
| JP | 11-33338 A1 | 2/1999 |
| JP | 2001-219026 | 8/2001 |
| JP | 2001-219026 A1 | 8/2001 |

* cited by examiner

*Primary Examiner* — Jason M Greene
(74) *Attorney, Agent, or Firm* — Factor Intellectual Property Law Group, Ltd.

(57) ABSTRACT

A vertically directed dryer unit for compressed air, comprising a dryer cartridge which, together with a housing, defines an inlet head area and an outlet head area. A plurality of hollow membrane fibers extend inside the cartridge between the two head areas, the wall material thereof being more permeable with respect to water vapor than air. An outlet valve is provided between the outlet head area and an outlet of the drier unit. Said valve only opens when the pressure in the outlet head area produces sufficient pressure for the provision of purging air. The purging air is fed to the outer surface of the membrane fibers via a throttle element.

20 Claims, 11 Drawing Sheets

DRYER UNIT FOR COMPRESSED AIR AND OTHER GASEOUS MEDIA

RELATED APPLICATIONS

The present invention is a divisional application of U.S. patent application Ser. No. 11/663,216 filed Mar. 20, 2007 which claims benefit to the filing date of PCT Patent Application PCT/EP2005/010424, filed Sep. 27, 2005; which claims priority to German Patent Application DE102004047216.5, filed Sep. 27, 2004, and German Patent Application DE102004048438.4, filed Oct. 1, 2004; the contents of all these applications are incorporated herein by reference.

TECHNICAL FIELD

The invention relates to a dryer unit for compressed air and other gaseous media according to the precharacterising clause of Claim 1.

Dry compressed air is required particularly for medical and dental purposes. Corresponding compressed-air installations therefore use dryer units which remove moisture from the compressed air provided at the output of a compressor.

In this regard, inter alia, dryer units in which the water is removed from the compressed air using membranes which are permeable only to water vapour are known. However, these dryer units working on the membrane principle work satisfactorily only in continuous operation. The air with a high vapour content flows through the hollow-fibre membrane, the vapour fractions passing through the fibre walls. This water vapour which has emerged is discharged from the housing of the dryer unit using a partial stream of the dried air which is branched off via a throttle point from the quantity of air obtained at the output of the dryer unit.

In the starting phase, large quantities of moisture are introduced, but there is not sufficient purging air available, since the pressure in the system must first be built up. Consequently, the water vapour is not sufficiently carried away from the outside of the membrane fibres either. Air with a high water content (high dew point) is thus supplied to the pressure tank in the starting phase of the installation.

Precisely the compressed-air generator units employed in the medical and dental field, however, are very irregularly used and therefore frequently switched on and off, so that the aforementioned disadvantages are serious.

The present invention is directed to addressing these and other matters.

SUMMARY OF THE INVENTION

One aim of the present invention is therefore to develop a dryer unit for compressed air and other gaseous media. The dryer unit includes a housing having an inlet for air to be dried and an outlet for dried air; and an exchanger unit, which has a multiplicity of hollow membrane fibres, the ends of which are fixed, open, in two holding plates which—together with the housing—delimit an inlet-side head space and an outlet-side head space. A purging air space which is connected to the outer surfaces of the membrane fibres includes a purging air inlet and a purging air outlet and being charged with part of the dried air in such a way that better water vapour separation in the starting phase is obtained.

This object may be achieved by the above dryer unit having the outlet-side head space connected to the outlet via an outlet valve or an outlet throttle.

In the dryer unit according to the invention, only a reduced flow connection, if any, exists in the starting phase between the outlet-side head space of the housing and the compressed-air storage tank and the lines leading to them. The effect achieved by this is that the pressure in the dryer unit builds up very quickly, so that purging air which can sweep along the outsides of the membrane fibres is also quickly available, and it is thus ensured that the desired working conditions in the dryer unit itself are quickly reached.

When the dryer unit has then reached its steady state, the flow connection to the compressed-air storage tank can be completely or increasingly freed.

The development of the invention according to another aspect of the present invention provides for the outlet throttle being adjustable—preferably on a time basis and/or as a function of the pressure prevailing in the outlet-side head space and/or of the moisture content of the purging air discharged at the purging air outlet—which allows the flow connection between dryer unit and compressed-air storage tank to be progressively freed. As a result, on the one hand, quick refilling of the compressed-air storage tank is ensured and, on the other hand, too great a fall of the pressure in the dryer unit, which could lead to the aforementioned disadvantages, is prevented.

The adjusting of the opening cross-section of the outlet throttle can preferably be effected as a function of pressure prevailing in the outlet-side head space, wherein the outlet valve is controlled on a time basis and/or as a function of the pressure prevailing in the outlet-side head space and/or of the moisture content of the purging air discharged at the purging air outlet. Control of the throttle on a time basis or as a function of the moisture content of the discharged purging air is likewise possible. The various types of control can also be used in combination.

In another development of the invention wherein the outlet valve is designed as a pressure governor, it is ensured in a simple manner that the pressure in the outlet-side head space does not fall below a predetermined pressure.

If the outlet valve is designed in a particularly simple geometry such that the outlet valve has a plane control element which, on the one hand, communicates with the outlet-side head space and, on the other hand, cooperates with a valve seat which communicates with the outlet for dried air it is also possible to place the surfaces, pressurised on the inlet side, and the surface, pressurised on the outlet side, of the control element on the same side of the latter, so that the control element is locked in the open state by the pressure of the controlled medium. This ensures a large throughflow cross-section of the outlet valve under steady-state working conditions.

An additional aspect of the present invention provides advantages with regard to a simple and mechanically reliable construction of the outlet valve wherein the outlet valve includes a plane control element which, on the one hand, communicates with the outlet-side head space and, on the other hand, cooperates with a valve seat which communicates with the outlet for dried air and 6 are advantageous with regard to a simple and mechanically reliable construction of the outlet valve.

In a further development of the present invention according to yet another aspect, the outlet valve is a solenoid valve which is controlled as a function of the output signal of a pressure sensor connected to the outlet-side head space. Such a configuration ensures that the pressure in the outlet-side head space of the dryer unit does not fall below a minimum value. Accordingly, it is also possible to change the switching point of the outlet valve in a simple manner by adjusting an electronic reference value generator. It is thus possible to adapt the dyer unit without mechanical interventions to specific working conditions, e.g. intake air of varying moisture, use of different membrane fibres, different requirements placed on the degree of drying of the air, etc.

In yet another further aspect of the dryer unit of the present invention, the outlet valve is a solenoid valve which is controlled as a function of the output signal of a pressure sensor connected to the outlet-side head space. Thus providing the ability to progressively free the flow path between dryer unit and compressed-air storage tank, by operating the solenoid valve in pulsed mode and adjusting the relationship between open time and closed time, which is possible with known electronic means again in a simple manner and without mechanical intervention in the dryer unit.

The control of the valve duty factor is equally possible as a function of the pressure in the outlet-side head space, on a time basis or as a function of the moisture contents of the discharged purging air. The various types of control can also be used in combination.

If air contains very high moisture fractions, then it is possible that, already after passing through a cooler connected downstream of the outlet of the compressor, liquid fractions in the air are precipitated in the form of fine droplets or aerosols. Typically, membrane fibres are provided on their inside with a special coating which is selectively permeable to water molecules. Owing to their nature, these coatings are water-soluble. If water droplets or aerosol come into contact with them, the coating may be damaged, so that the dryer unit is permanently damaged.

With the development of the present invention according to another aspect, wherein a cyclone and/or a coalescent filter is connected upstream of the inlet-side head space, it is ensured that liquid fractions contained in the entering compressed air which have already condensed are reliably and simply separated from the supplied air.

In a still further aspect of the present invention, wherein the cyclone and/or the coalescent filter is arranged on the lower end of the vertically oriented housing, the actual dryer unit and the cyclone form a compact unit, which is advantageous with regard to the space requirement and with regard to avoiding assembly work on site. Dryer unit, water separator and heat exchanger unit are vertically arranged. An accumulation of liquid in front of the membrane unit is thus avoided. Any condensation water droplets which are formed are carried away by the force of gravity downwards into a collecting sump.

In a further development of the present invention, providing a drip element falling away radially outwards at the lower end of a cyclone wall of the cyclone or of a coalescent filter is particularly advantageous with regard to the fact that water separated in the cyclone combines to form larger drops which reliably fall into a sump of the cyclone without being entrained once again by air which is moved by the cyclone.

In yet another aspect of the present invention the drip element is placed on the lower end of the cyclone wall or of the coalescent filter, preferably held there in a vertically displaceable manner, and is advantageous with regard to a simple mounting of the drip element.

In a still further aspect of the present invention, the type of connection between draining element and cyclone circumferential wall includes the lower edge of the cyclone wall being formed with resilient fingers, between which the drip element is held with play axially displaceably, and being simultaneously held captively by the cyclone wall by holding lugs of the holding fingers. Such a connection is advantageous with regard to a simple production from injection-moulded parts.

In a further development of the present invention providing a liquid-retaining filter being arranged in a chamber of the cyclone housing—which chamber lies above the cyclone wall of the cyclone—a further improved preseparation of small condensed liquid fractions in the compressed air can be effected, since these fractions remain in the liquid-retaining filter.

For the purposes under consideration here, liquid-retaining filter materials comprise a hydrophobic nonwoven material or a hydrophobic sintered material and have proved particularly successful in this case.

Another aspect of the present invention includes an upper end wall of a cyclone part designed as an upwardly open dish and is provided with at least one outlet opening to facilitate the effect that liquid drops which are formed from the liquid fractions retained in the liquid-retaining filter are led in a controlled manner to the collecting sump of the cyclone.

In yet another aspect of the present invention, the inlet-side head space is thermally coupled to a heat exchanger and serves to avoid fractions in droplet form and aerosol fractions in the compressed air entering the membrane fibres. These constituents are converted into vapour form by the heat exchanger arranged in the inlet-side head space.

A particularly intimate contact with the compressed air supplied to the membrane fibres is produced by the arrangement of the heat exchanger wherein the heat exchanger extends in the transverse direction with respect to the axis of the inlet-side head space, preferably intersecting the axis of the inlet-side head space.

In yet another aspect of the present invention the heat exchanger has a heat exchanger pipe with heat exchanger ribs placed on it, which is advantageous with regard to a good heat transfer to compressed air supplied to the membrane fibres. Further still, a heat exchanger having a heat exchanger pipe with heat exchanger ribs placed on it is compact and has a large heat-exchange surface.

In still a further aspect of the present invention, the heat exchanger is a metal part and thus is advantageous with regard to good heat transfer to compressed air supplied to the membrane fibres.

In another aspect of the present invention, the housing of the dryer unit includes three main units: an inlet-side head piece, an outlet-side head piece and an elongated housing part lying therebetween and surrounding a dryer cartridge which comprises the arrangement of membrane fibres and the membrane fibre holding plates. Such a configuration is advantageous with regard to simple maintenance and simple exchange of the active dryer medium.

In another aspect of the present invention, the dryer cartridge has a sleeve-shaped cartridge housing, at the ends of which the two holding plates are attached in a sealed manner—the effect achieved in a simple manner is that the cartridge securely holds the membrane fibres, which are not very stiff, and the sealing walls required at the two head spaces are obtained.

In accordance with anther aspect of the present invention the sleeve-shaped cartridge housing has two purging air openings which are axially spaced and preferably adjacent to the cartridge ends, and which are in each case preferably formed as sets of openings distributed in the circumferential direction. The cartridge housing, which gives the membrane fibres stability, can simultaneously be used as a delimitation of a purging air chamber which surrounds the membrane fibres and through which the purging air is led.

The development of the present invention according to yet another aspect includes the head pieces and the middle housing part being detachably connected to one another, which is advantageous with regard to a simple fitting of seals, by which the cartridge unit are sealed off from the housing.

In a further aspect of the present invention connecting rings are provided at the junctions between the head pieces and the middle housing part or segments of the middle housing part, which is advantageous, on the one hand, with regard to a flush alignment of the segments of the middle main unit of the housing. In addition, it facilitates the fitting of sealing rings between cartridge unit and housing.

In another aspect of the dryer unit of the present invention, at least one of the connecting rings forms a passage to the outside of the housing, preferably a multiplicity of passage openings distributed evenly in the circumferential direction. As such, one of the connecting points of the segments of the cartridge housing can simultaneously constitute an annular outlet slot for purging air. A uniform distribution of the purging air flow in the membrane fibre bundle is thus obtained with very simple mechanical means.

According to yet another aspect of the present invention at least one of the connecting rings simultaneously constitutes a supporting ring for a sealing ring, via which the dryer cartridge is sealed off from the housing. The connecting rings provided in the segments of the middle main unit of the housing can simultaneously form supporting rings for sealing rings, by which the cartridge unit is sealed off from the housing of the dryer unit.

In a still further aspect of the present invention the outlet-side end of the dryer cartridge is sealed off from the housing by two spaced sealing rings and the space lying axially between the two sealing rings is connected to the outlet-side head space via a throttle. Thus, the connection between the purging air entrance of the cartridge unit and a throttle connected to the outlet-side head space is obtained in a simple manner. This flow connection is automatically established when the different main units of the housing of the dryer unit are joined together.

The development of a further aspect of the present invention includes the purging air inlet having a central purging air feed channel or an annular purging air feed channel that also serves for good uniformity of distribution of the purging air. A better utilisation of the purging air and a higher yield of usable dried air are thus obtained.

In a further aspect of the present invention, providing the coalescent filter with a throughflow from the inside outwards is advantageous with regard to favourable guidance of the air and good dripping off of drops formed on the coalescent filter.

In a still further aspect of the present invention means are provided which lead the air to be treated substantially rotationally symmetrically onto the rotationally symmetrical coalescent filter. Thus it is ensured that no cyclone effect is obtained in the interior of the coalescent filter. Consequently, the moisture contained in the air, including small droplets which may be present, can migrate through the filter material and is discharged, having coalesced to larger drops, on the outside of the coalescent filter and can be led into a collecting container there.

Another aspect of the present invention includes a chamber lying on the exit side of the coalescent filter and configured in such a way that the flow rate of the air in it is reduced. Thus it is ensured that droplets entrained by the air separate, downstream of the coalescent filter, under the effect of gravity from the slow-moving air and likewise fall into the above-mentioned collecting container.

In a still further aspect of the present invention, a signal disc is provided, around which treated air flows, and which with a first moisture content of the air has a first appearance and with a second moisture content of the air has a second appearance different from the first, and is visible through a window of the housing—upon which the correct working of the dryer unit can be visually monitored in a simple manner.

In a further aspect of the present invention, the window is designed as a lens, and thus is particularly clear.

These and other objects and advantages will be made apparent from the following brief description of the drawings and the detailed description of the invention.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIGS. 1 to 4 a dryer unit is denoted as a whole by 10, which unit receives air from a compressor 12 and delivers compressed air which has been largely freed from moisture to a compressed-air storage tank 14.

Figures 1, 2:
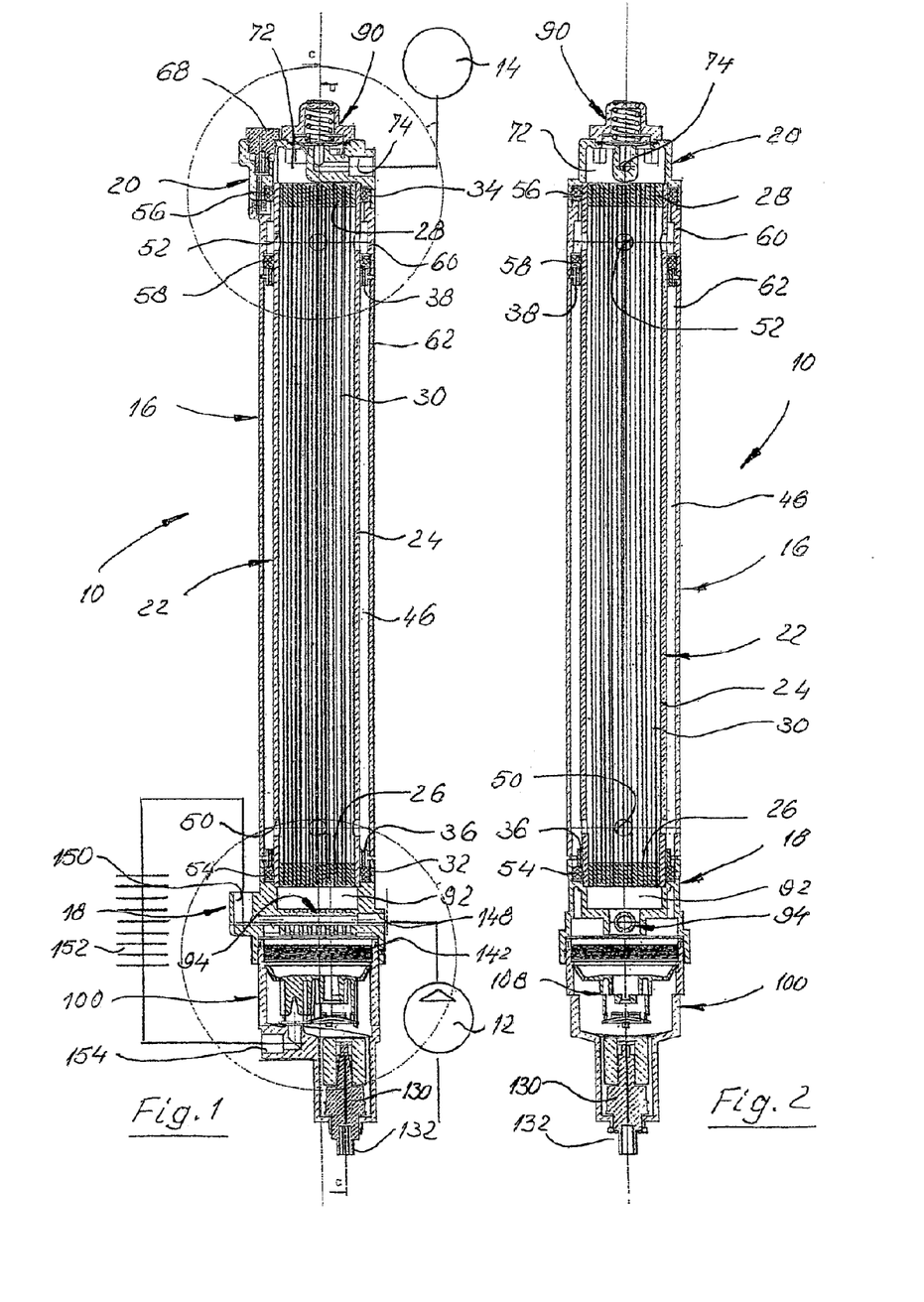
FIG. 1: shows an axial section through a compressed-air dryer unit installed in a compressed-air installation for a dental practice.
FIG. 2: shows a further axial section through the dryer unit shown in FIG. 1, in a plane perpendicular to the drawing plane of FIG. 1.

The dryer unit 10 comprises a cylindrical housing 16 which is closed at its ends by a lower head piece 18 and an upper head piece 20, respectively. A dryer cartridge, denoted as a whole by 22, is arranged in the interior of the housing part 16 and with its ends projecting into the head pieces 18 and 20.

This cartridge comprises, for its part, a cylindrical cartridge sleeve 24 which is closed at its ends by holding plates 26, 28. The ends of a large number of hollow membrane fibres 30 are embedded in the holding plates 26 and 28, to be precise such that the ends of the membrane fibre are open.

The membrane fibres may in practice consist of PES (polyethersulphone) or PEI (polyetherimide). The diameter of the membrane fibres may be in the range from 100 to 3000 μm, their wall thickness from 20 to 1000 μm.

In order that the wall material of the membrane fibres 30 has a high specific permeability to water vapour, the inside of the membrane fibres 30 is provided with a coating which, owing to its nature, is highly hydrophilic. As a result, however, it is also water-soluble.

The dryer cartridge 22 is produced, for example, by combining the membrane fibres 30 into a corresponding bundle and producing the holding plates 26 and 28 by impregnating two regions spaced inwardly from the ends of the membrane fibre bundle with resin. The membrane fibres 30 are then cut off at the ends of the holding plates 26 and 28, so that the interior of the membrane fibres remain freely accessible.

The head pieces 18 and 20 each have a cylindrical skirt portion 32 and 34, respectively, which matches the cylindrical housing part 16.

Provided at the junctions between the skirt portion 32 and the cylindrical housing part 16 or between two segments 60 and 62 of the housing part 16 are connecting rings 36, 38. These rings have, as can be seen in particular from FIGS. 3 and 4, T-shaped transverse cross-section and are seated, with an outwardly projecting central flange 42, 44, between the opposite end faces of skirt portion 32 and housing part 16 or the segments 60, 62.

As can be seen from the drawing, the cartridge sleeve 24 has a smaller diameter than the housing part 16, so that an annular space 46 is obtained.

Figure 3:
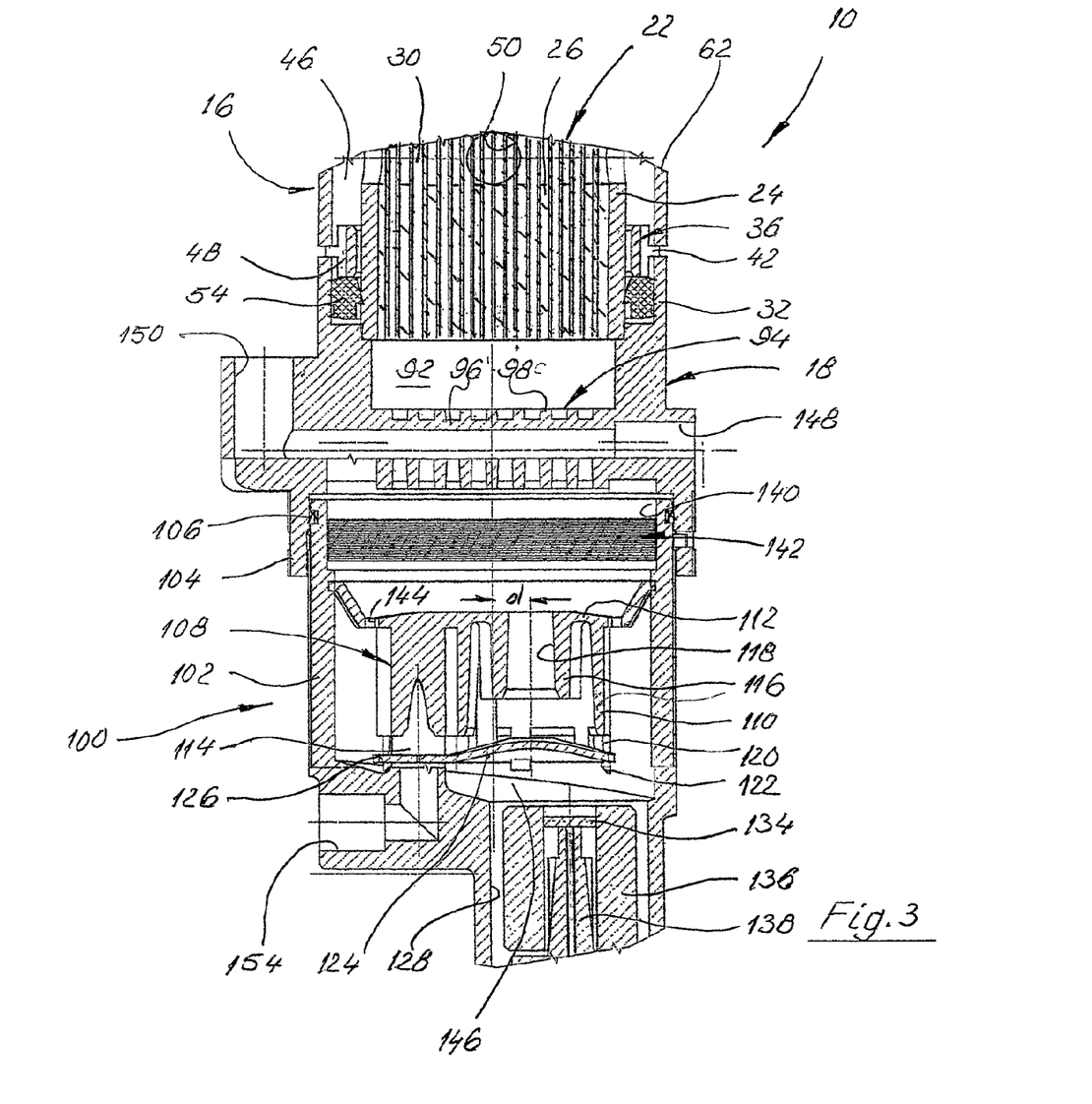
FIG. 3: shows an enlarged illustration of a lower head part of the dryer unit shown in FIG. 1.
Figure 4:
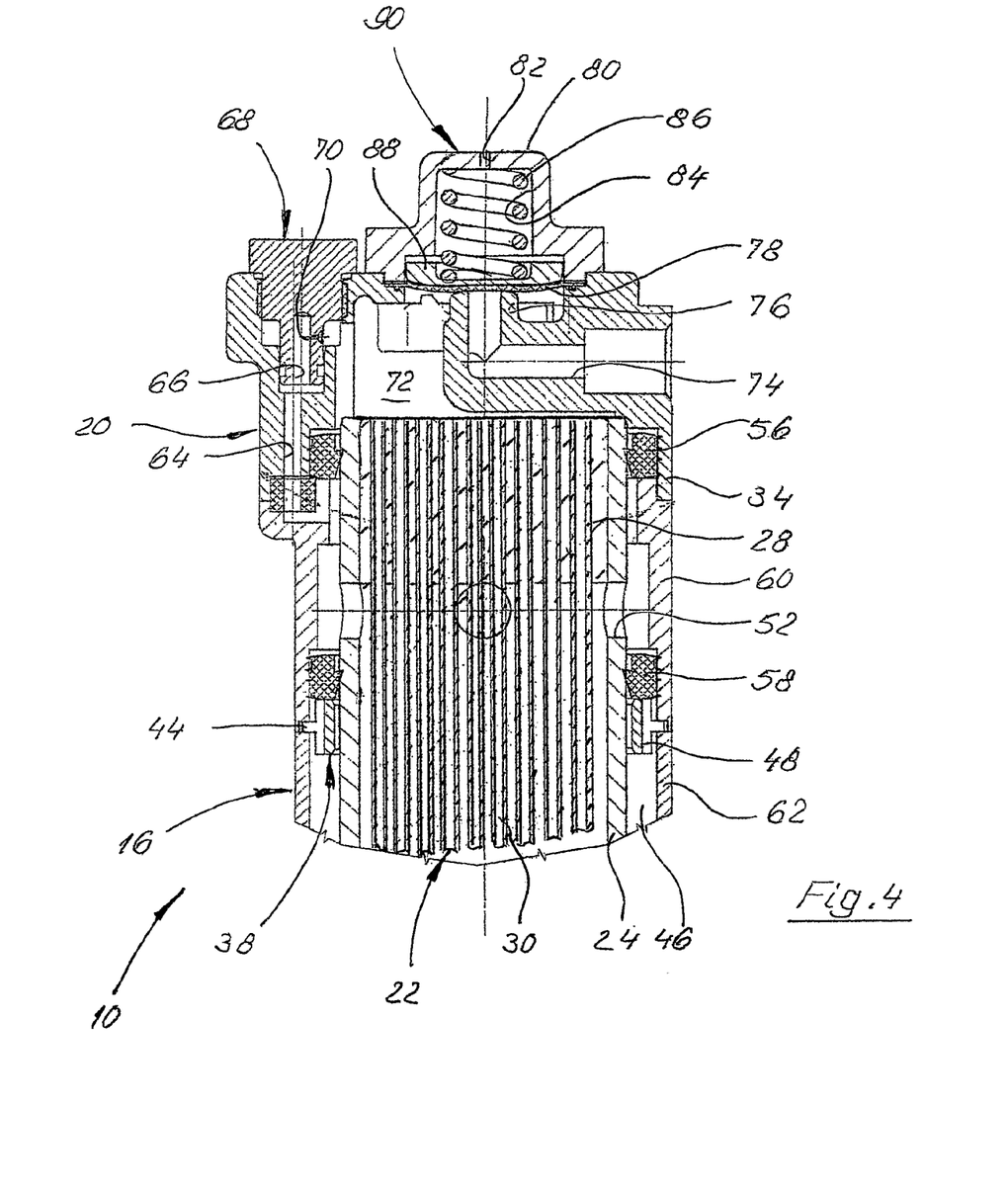
FIG. 4: shows an enlarged illustration of an upper head part of the dryer unit shown in FIG. 1.

As can be seen from FIG. 3, the connecting ring 36 has outwardly open grooves 48 distributed in the circumferential direction. In this way, a lower outlet slot for the annular space 46 is obtained.

The annular space 46 is connected to the interior of the cartridge sleeve 24 via four openings 50 evenly distributed in the circumferential direction and provided in the lower portion of the cartridge sleeve 24. Similarly, four openings 52 evenly distributed in the circumferential direction are provided in the upper portion of the cartridge sleeve 24.

The dryer cartridge 22 is held in the housing, formed by the head pieces 18, 20 and the housing part 16, using three sealing rings. A lower sealing ring 54 seals the skirt portion 32 of the head piece 18 off from the lower end of the cartridge sleeve 24.

An uppermost sealing ring 56 similarly seals the upper end of the cartridge sleeve 24 off from the upper head piece 20. As can be seen from the drawing, the sealing rings 54, 56 lie axially beyond the openings 50 and 52.

An additional sealing ring 58 is provided below the openings 52 and seals the outer surface of the cartridge sleeve 24, again, off from the housing part 16.

In order to enable fitting of this sealing ring, the cartridge sleeve 24 is split a little below the sealing ring 58, the upper connecting ring 38 being arranged at the junction between the upper end segment 60 and the main segment 62 of the housing part 16.

The axial portion of the annular space 46 which lies between the sealing rings 56 and 58 and is connected to the openings 52 is connected to a central bore 66 of a nozzle screw 68 via a channel 64 and housing passages, not provided specifically with reference symbols, and in the upper head piece 20. The nozzle screw 68 has a throttle bore, denoted by 70, which is connected to an upper head space 72 in the upper head piece 20. The head space 72 is delimited by the head piece 20 and the upper holding plate 28.

Also provided in the upper head piece 20 is an angled outlet channel 74, which comprises a vertically upwardly running pipe stub 76. The pipe stub 76 forms with its upper end face a valve seat which cooperates with a valve membrane 78. The latter is circular and arranged coaxially with the pipe stub 76.

The valve membrane 78 is clamped between the upper side of the head piece 20 and a valve housing 80, which is connected to the head piece 20 by screws, not shown specifically.

The valve housing 80 is formed with a spring chamber 84 which is connected to the surroundings via a vent opening 82 and accommodates a helical spring 86. The lower end of the latter acts on the upper side of the valve membrane 78 via a rounded spring seat 88.

The strength of the helical spring 86 is chosen such that the outlet valve 90, comprising the above-described components 78 to 88, of the dryer unit opens at a pressure which ensures that a sufficient quantity of purging air is supplied to the upper openings 52 of the cartridge sleeve 24 via the throttle bore 70. The purging air then flows in the interior of the cartridge sleeve 24 downwards between the membrane fibres 30, leaves the cartridge sleeve 24 at the bottom through the openings 50, and leaves the housing of the dryer unit through the annular outlet slot at the lower connecting ring 36.

The lower holding plate 26 of the dryer cartridge 22 delimits, together with the lower head piece 18, a lower head space 92. The latter has a greater axial extent than the upper head space 72, in order to arrange there a transverse heat exchanger 94 which intersects the head space axis. The heat exchanger 94 comprises a central horizontal heat exchanger pipe 96, on which transverse, vertically oriented heat exchanger ribs 98 are seated.

In the exemplary embodiment considered here, the heat exchanger 94 is in one piece with the lower head piece 18. The heat exchanger 94 may, however, also be a separate metal part produced from metal with a particularly good thermal conductivity.

Arranged on the lower side of the lower head piece 18 is (cf. in particular FIG. 3) a cyclone, denoted as a whole by 100.

The cyclone comprises an essentially cup-shaped housing 102 which engages by its upper end in a hanging-down matching skirt 104 of the head piece 18 and is sealed off from this skirt via a seal 106.

A cyclone part 108 is inserted into the housing 102. This cyclone part has a cyclone wall 110 running in the circumferential direction and an upper end wall 112 which is formed as a shallow frustoconical dish.

The axis of the cyclone wall 110 is arranged laterally offset from the axis of the dryer unit, as can be seen from the figures. The distance between the axes is denoted by d in the drawing.

Formed in the lower portion of the cyclone part 108 is an angled inlet channel 154 which is connected to an inlet stub 114 of the cyclone part 108. The cyclone inlet channel which is defined by the inlet stub 114 runs around in the upper portion in the horizontal direction and opens tangentially into the inner surface of the cyclone wall 110.

Hanging downwards from the end wall 112 of the cyclone part 108 is a cylindrical partition wall 116 which delimits an outlet channel 118 of the cyclone part 108.

Provided at the lower end of the cyclone wall 110 are a plurality of elastic holding fingers 120 which are distributed in the circumferential direction and are provided at their lower ends with inward-pointing holding lugs 122.

The holding fingers 120 cooperate with the edge of a drip disc 124 which, seen from above, is convexly curved. At its edge the drip disc 124 has projecting teeth 126, by which it engages in the recesses lying between the holding fingers 120. In this way, the drip lug 124 is held in an axially displaceable but rotationally locked manner by the lower edge of the cyclone wall 110. The drip disc 124 can be attached to the cyclone part 108 simply by latching on.

A sump 128 for separated liquids is provided in a lowermost portion of the cyclone housing 102. This sump is connected to an outlet stub 132 via a peg-shaped outlet fitting 130. The outlet fitting 130 has a central channel which opens out into the reduced-diameter end face of the outlet fitting 130. This opening-out point forms a valve seat, with which a valve disc 134 cooperates. The latter is borne by a float 136 which is arranged axially displaceably on a reduced-diameter guide portion 138 of the outlet fitting 130.

Formed in an upper end portion of the cyclone housing 102 is a filter chamber 140, in which a retaining filter 142 for very small liquid droplets and aerosol is arranged. The filter material of the retaining filter 142 is a hydrophobic nonwoven material or a hydrophobic sintered material.

Liquid fractions which are retained in the retaining filter 142 drip downwards from the retaining filter 142 and into the dish formed by the end wall 112. From there, they pass outlet opening 144 provided in the bottom of the dish into the annular space lying between the outer surface of the cyclone part 108 and the inner wall of the cyclone housing 102. There, the dripping liquid then passes via an inclined bottom surface 146 to the sump 128. As can be seen from the drawing, when the dryer unit is installed, an inlet 148, which is connected to the heat exchanger 94, is connected to the outlet of the compressor 12.

An intermediate outlet 150 of the dryer unit, which is connected to the outlet of the heat exchanger 94, is connected to the inlet of a lamellar cooler 152. The outlet of the latter is connected to the inlet channel 154 of the cyclone 100.

The above-described dryer unit works as follows:

When the compressor 12 is switched off, firstly the compressed-air storage tank 14 is separated from the interior of the dryer unit 10, since the interior space of the dryer unit 10 is not pressurised and under these conditions the force of the helical spring 86 is sufficient to keep the valve membrane 78 firmly in contact with the upper side of the pipe stub 76.

When the compressor 12 is switched on again, firstly pressure is built up in the dryer unit. With the build-up of pressure in the upper head space 20, purging air then already starts to flow via the throttle bore 70 and through the interior of the cartridge sleeve 24. This purging air entrains moisture situated between the membrane fibres 30.

When the pressure in the upper head space 72 reaches a value such that the force of the helical spring 86 is overcome owing to the total pressure applied to the valve membrane 78, a flow connection is freed between the upper head space 72 and the compressed-air storage tank. From this point in time, dried air is then delivered by the dryer unit 10 to the compressed-air storage tank 14. As the moisture-containing air flows through the membrane fibres 30, the water vapour fractions then pass to a large extent through the fibre walls, so that the delivered air has a low water content, i.e. is well dried.

A predetermined fraction of the quantity of dry air reaching the upper head space 72 is removed via the throttle bore 70, and as described above used to purge the water vapour fractions, which have passed through the walls of the membrane fibres 30, from the cartridge sleeve 24 and the dryer unit.

The compressed air supplied by the compressor 12 is hot (greater than 100° C.) and on flowing through the heat exchanger 94 gives off some of its heat to the compressed air flowing through the lower head space 92. Any remaining condensed liquid fractions still present for instance in the compressed air downstream of the cyclone 100 and downstream of the retaining filter 142 are converted by the supplied heat into vapour fractions. Thus, no condensed fractions get into the membrane fibres 30, where they could damage the coating of the latter.

The air leaving the heat exchanger 94 is cooled in the lamellar cooler 152. The droplets resulting during this are separated in the cyclone 100. For instance, any remaining very small droplets and aerosol fractions are retained in the retaining filter 142. The air entering the membrane fibre 30 at the bottom has thus already been well predried.

The liquid fractions which are separated in the retaining filter 142 and the cyclone 100 pass into the sump 128 and are automatically drained off at intervals by the float-actuated valve disc 134.

Alternatively, the float 136 can actuate a contact, by which a solenoid valve or a pneumatically actuated valve is controlled.

Figure 5:
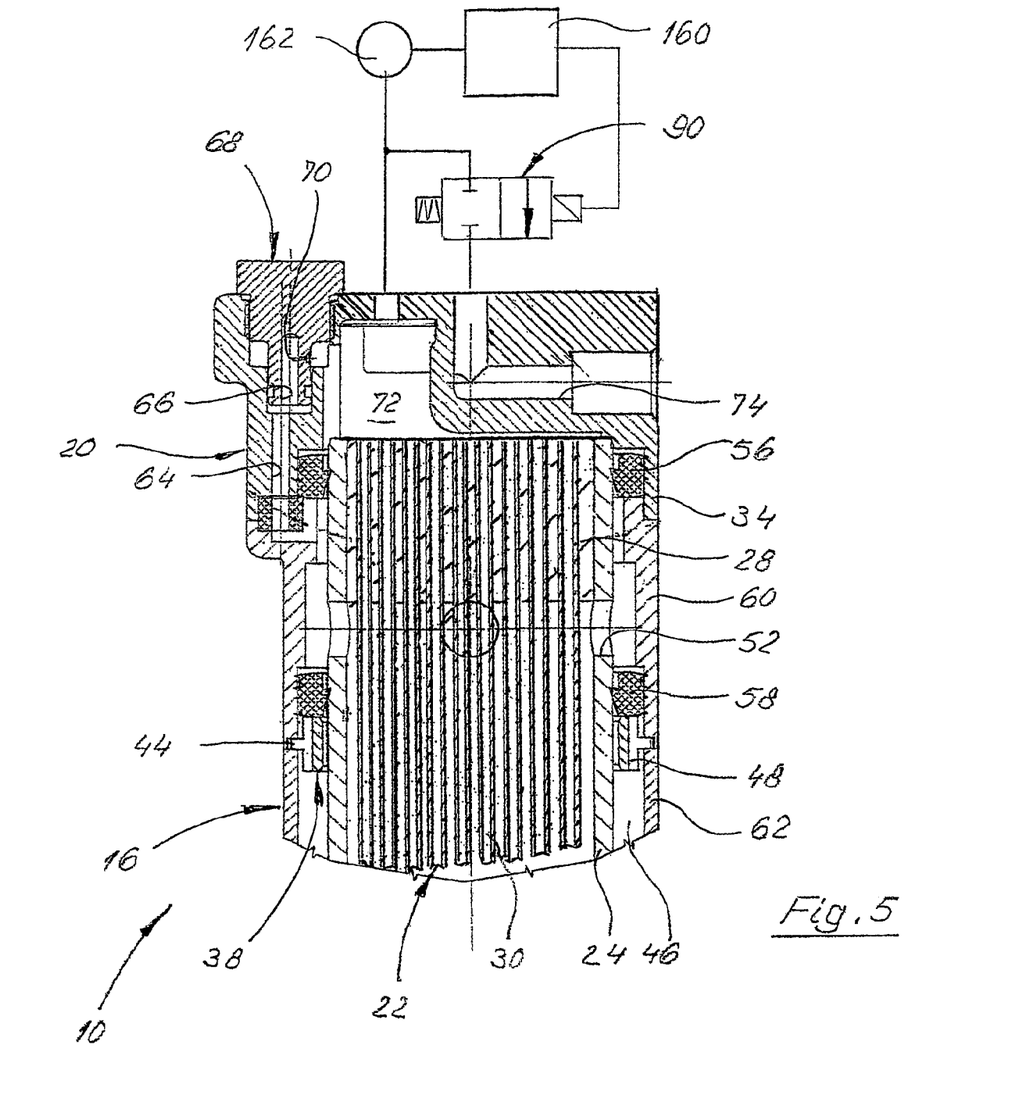
FIGS. 5 and 6: show similar views to FIG. 4, in which variants of the control system of the flow connection between the dryer unit and a downstream compressed-air storage tank are shown.

In the exemplary embodiment according to FIG. 5, the outlet valve 90 is designed as a solenoid valve. This solenoid valve is now driven via a control circuit 160 which works as a function of the output signal of a pressure sensor 162 communicating with the upper head space 72.

The control circuit 160 preferably works in such a way that it operates the outlet valve 90 in pulsed mode. In this case, the control circuit 160 can work in such a way that it keeps the outlet valve 90 completely closed until the pressure in the outlet-side head space 72 reaches a predetermined value which is sufficient to produce an adequate purging air flow. When this predetermined pressure value is reached, the control circuit 160 then works in such a way that, in a transition phase, it progressively increases the duty factor between open time and closed time of the outlet valve 90 until the pressure desired for steady-state working of the dryer unit is reached in the outlet-side head space 72. From this point in time, the duty factor the remains unchanged. Alternatively, from this point in time the outlet valve 90 can be operated in a permanent open position.

In a modification, the pressure sensor 162 may also be omitted and the control of the relationship between open time and closed time performed as a function of the time which has elapsed since the installation was switched on.

In a further modification, instead of the pressure sensor 162, use may be made of a moisture sensor which lies in the flow of the used purging air discharged via the connecting ring 36.

In a further modification, the above control options may also be all or partly combined.

Figure 6:
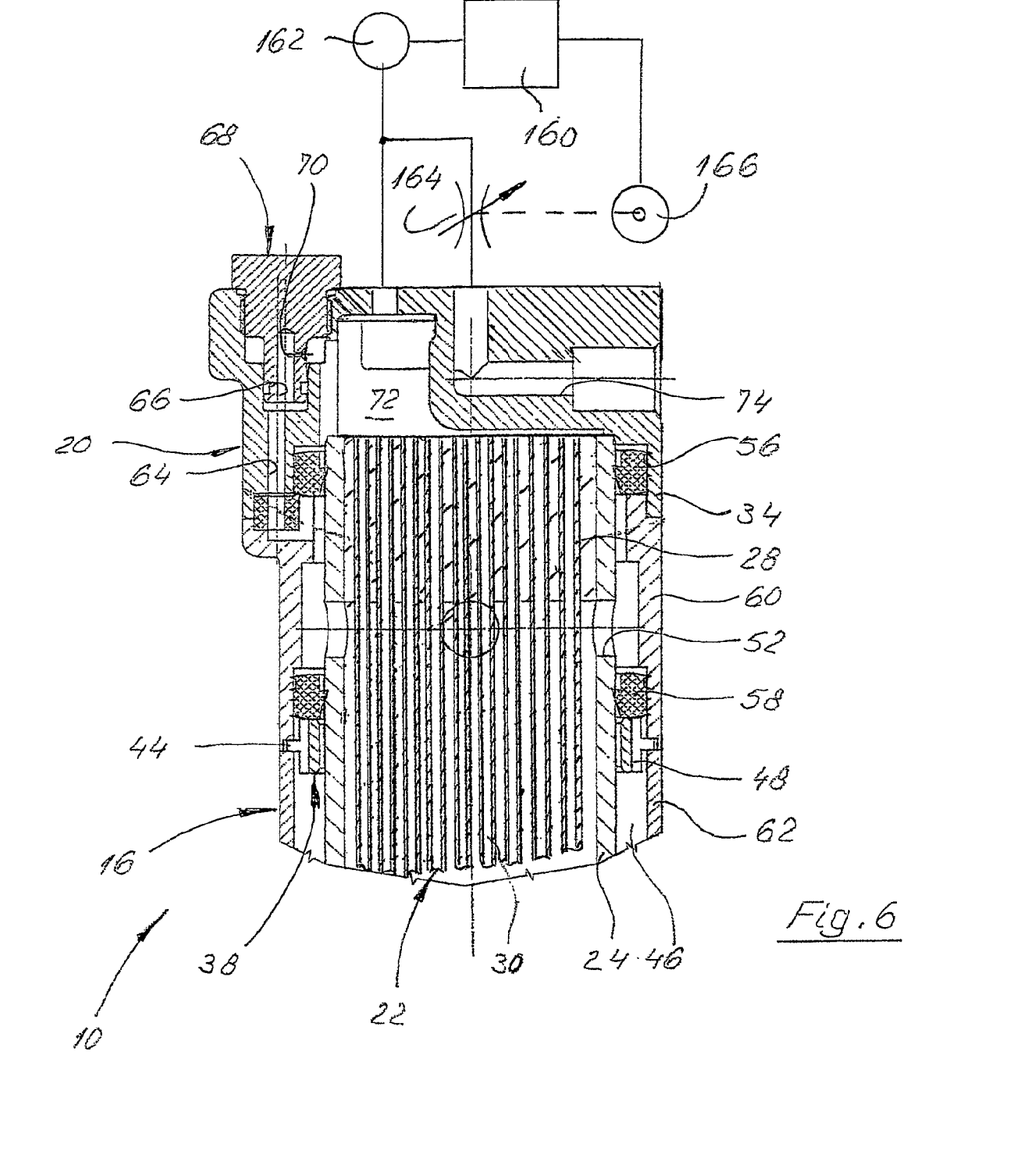

In the embodiment according to FIG. 6, instead of the outlet valve 90, there is provided an adjustable throttle 164, the throughflow cross-section of which is adjusted by a servomotor 166. In this exemplary embodiment, the servomotor 166 is activated by a modified control circuit 160, which again cooperates with a pressure sensor 162 connected to the upper head region 72.

If the pressure in the upper head space 72 in the starting phase of the dryer unit 10 is initially low, the control circuit 160 sets the throttle 164 to its maximum throttling position. Consequently, the pressure in the upper head space 72 can quickly build up again to the desired minimum pressure required for ensuring the supply of purging air. From this point in time, the control circuit 160 can then increasingly open the throttle 164, so that dry air is then increasingly delivered to the compressed-air storage tank 14.

Of course, an adjustable throttle can also be realised by using a plurality of fixed throttles connected in parallel, which are opened via solenoid valves.

Alternatively, the quantity of purging air may also be controlled by a proportional valve.

In this regard, again the three above-outlined control options according to the pressure in the outlet, on a time basis and according to the moisture content of the discharged purging air are in each case available individually and in combination.

Apart from the modified manner of controlling the flow connection between dryer unit 10 and compressed-air storage tank 14, the exemplary embodiments according to FIGS. 5 and 6 work in a similar manner to those according to FIGS. 1 to 4.

The head pieces 18 and 20, and also the cyclone housing 102 and the cyclone part 108, are preferably injection-moulded parts of metal, or plastic or fibre-reinforced plastic. The cylindrical housing part 16 may be a portion made of an extruded metal or plastic section which is machine-finished, where necessary.

In FIGS. 7 to 11, showing further embodiments, components which correspond in terms of function to those already discussed above are again provided with the same reference symbols, even if they differ in terms of details. These components are not described again in detail below.

In the exemplary embodiments according to FIGS. 7 to 11, the housing part 16 has been dispensed with. The cartridge sleeve 24 simultaneously ensures the fluid separation from the surrounding atmosphere.

Figure 7:
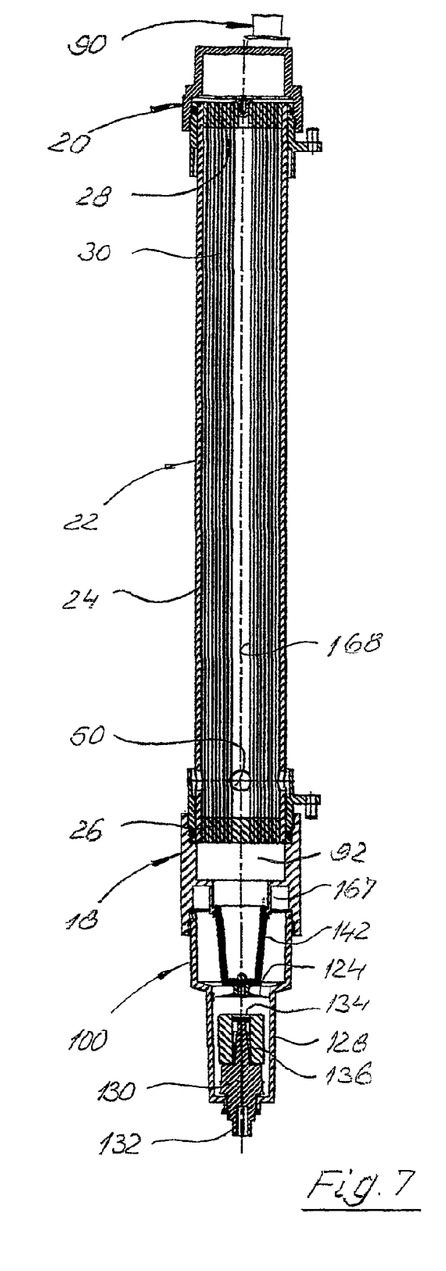
FIGS. 7 and 8: show similar illustrations to FIG. 1, in which, however, a modified dryer unit is represented.
Figure 8:
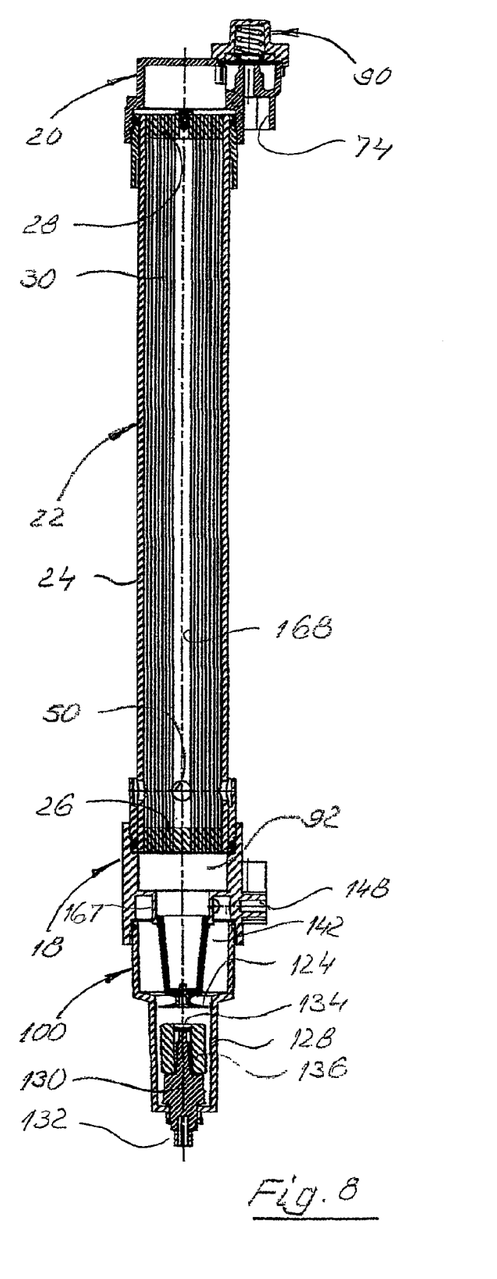
Figure 11:
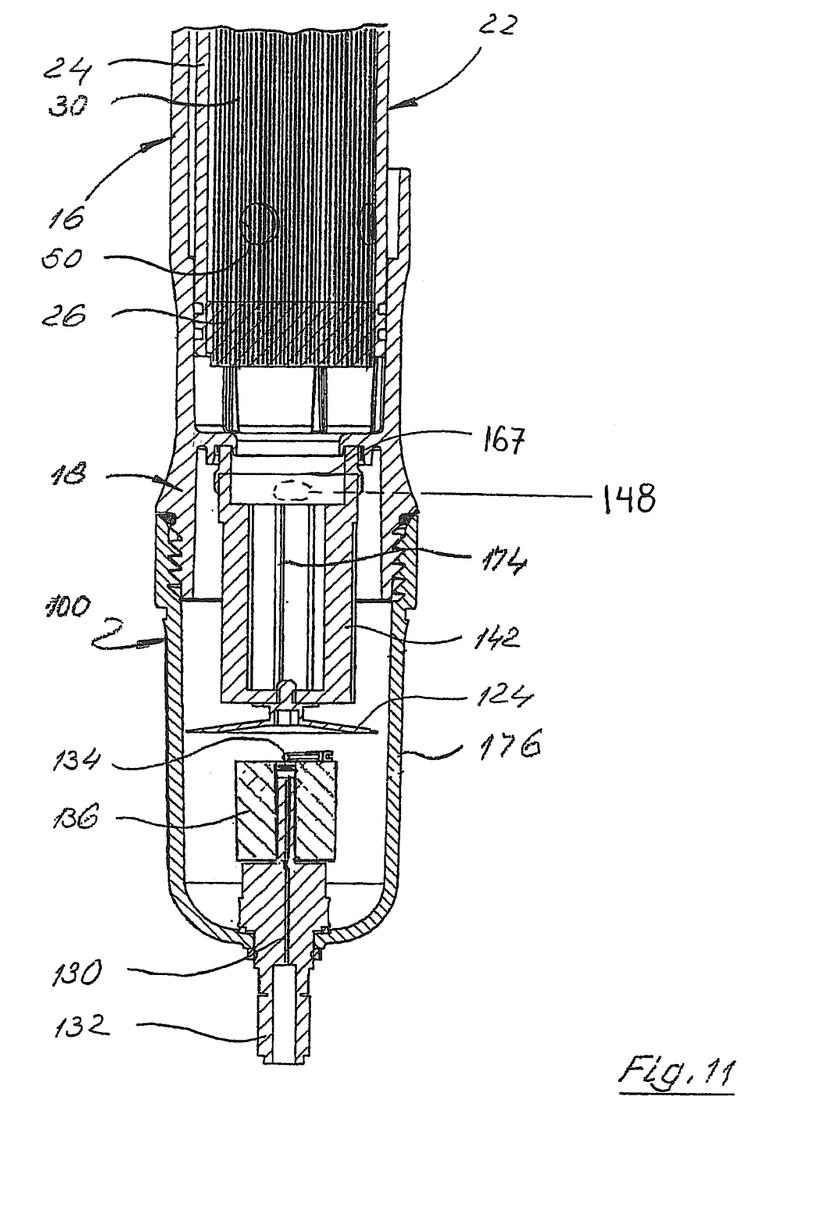
FIG. 11: shows an enlarged view of a lower head part of the dryer unit according to FIGS. 7 and 8.

The retaining filter 142 is designed as a coalescent filter produced from hydrophobic sintered material and has the shape of a truncated cone closed at the bottom and hanging from a carrying ring 167 of the head piece 18. The lower covering wall of the truncated cone carries the drip disc 124.

The inlet 148 opens tangentially into the cyclone 100. The air is thus freed from droplets by centrifuging, before it flows through the retaining filter 142 from the outside inwards and passes into the lower head space 92.

Figure 9:
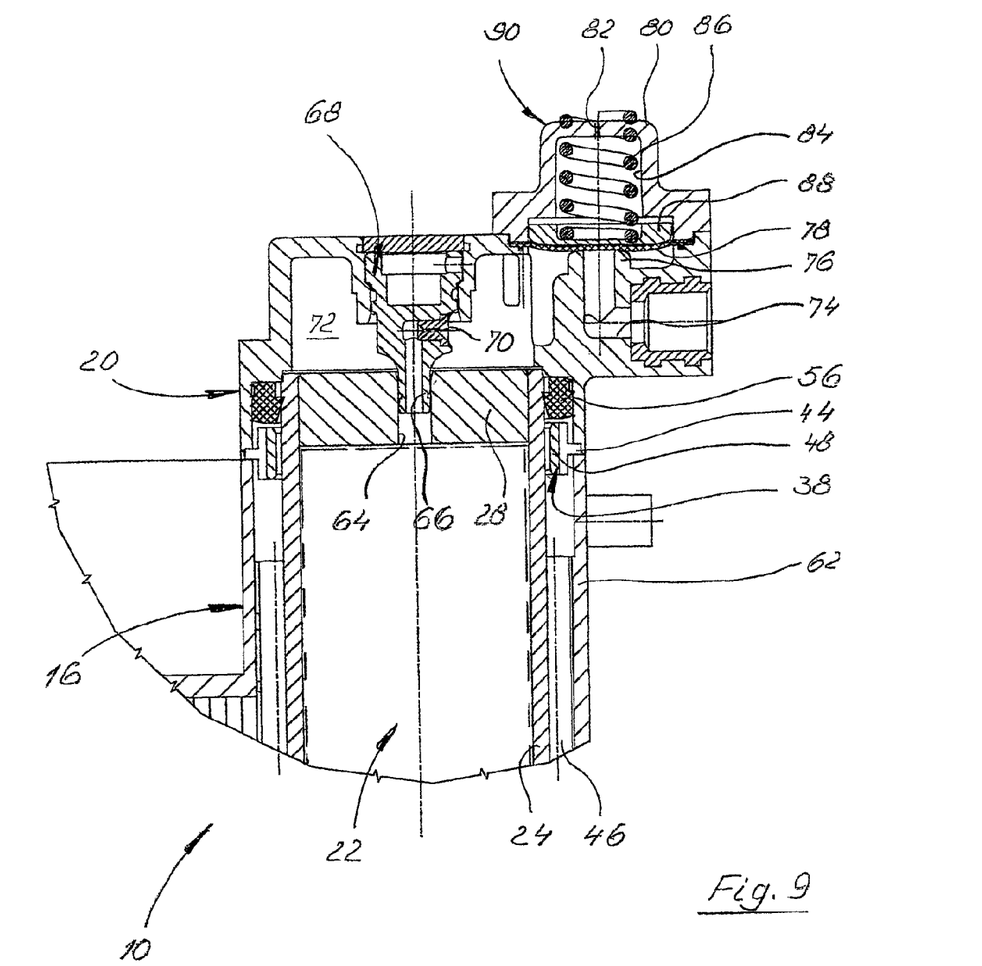
FIG. 9: shows an enlarged illustration of an upper head part of the dryer unit shown in FIGS. 7 and 8.

The purging air is fed in centrally via the channel 62 provided at the centre of the holding plate 28.

A central core space 168 of the cartridge 22 is also free of membrane fibres 30, in order to supply the lower regions of the membrane fibres sufficiently with fresh purging air.

Figure 10:
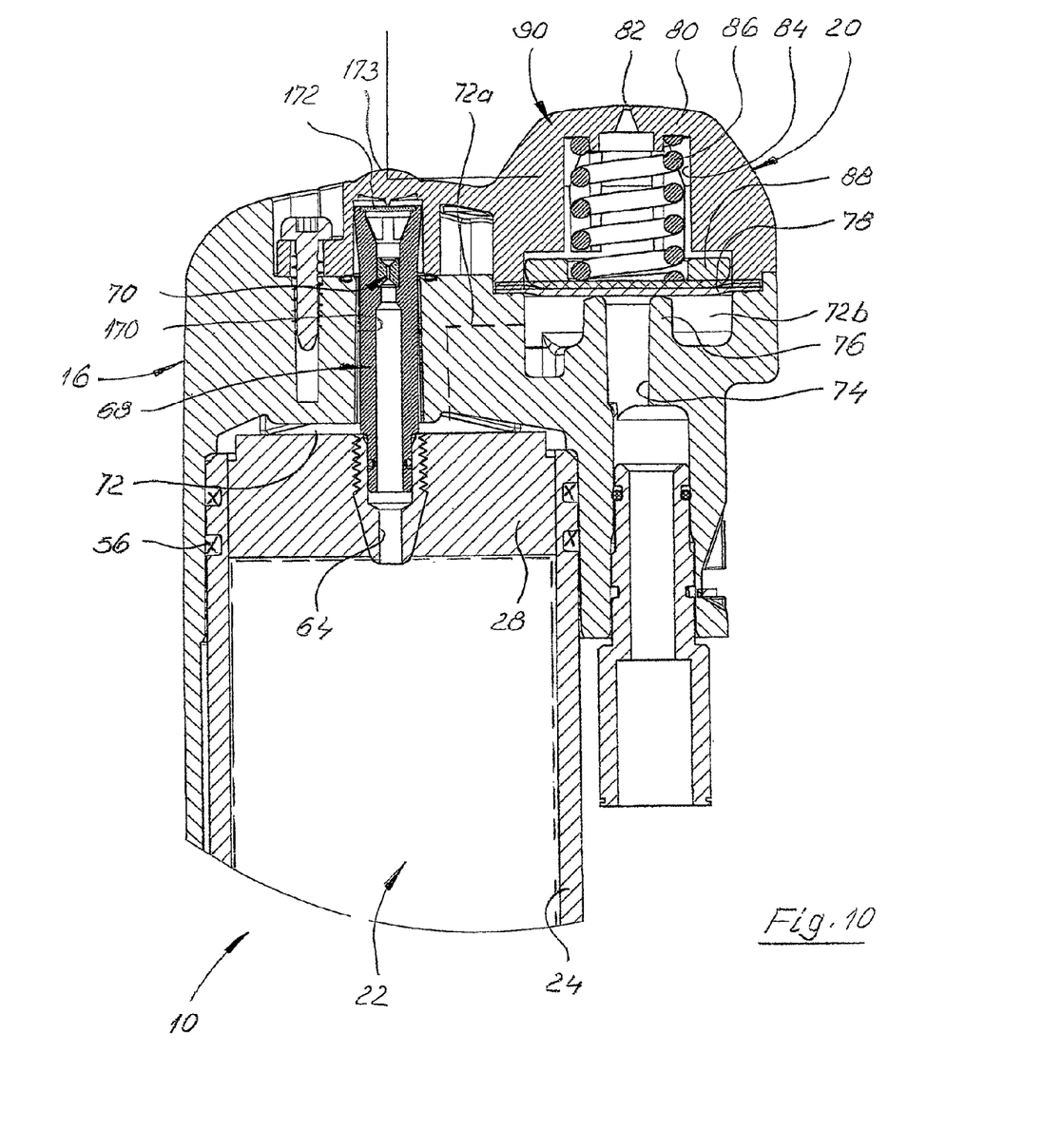
FIG. 10: shows a similar view to FIG. 9, in which a further variant of the head part is shown.

The head piece 20 according to FIG. 10 has a different, smaller separating area with respect to the housing part 16, but is comparable in terms of function to the head piece according to FIG. 9.

In the case of this head piece, the upper head space 72 is connected via a housing channel 72a to an inlet space 72b of the outlet valve 90. The purging air is supplied to the throttle 70 via a gap lying between a bore 170, accommodating the nozzle part 68, and the outer surface of the nozzle part 68 and leads to the rear end face of the nozzle part 68. The end face carries a porous signal disc 172.

Owing to the disc's arrangement, air flows around it, the air coming from the upper head space 72 and being led as purging air via the throttle 70 to the inside of the membrane fibre pack. The signal disc is made of a material whose appearance changes depending on the moisture content of the air flowing through it, a change of colour being preferred.

Changes in the structure of the surface or changes in the geometry of the signal disc would, however, also be suitable.

In the head part 20, which is made of transparent material, there is incorporated a lens 173 which enables clear assessment of the colour of the signal disc, even from a distance.

Furthermore, the outlet channel 74 is oriented parallel to the axis of the cartridge 22, enabling a radially more compact overall arrangement of dryer unit and line connections for some applications.

In the exemplary embodiment according to FIG. 11, the retaining filter 142 is cylindrical with internal axial reinforcing ribs 174. A lowermost housing part 176 can be unscrewed for maintenance purposes.

In a further modification, the lower end of the housing of the dryer unit may be designed in such a way that the retaining filter 142 has a throughflow from the inside outwards.

Figure 12:
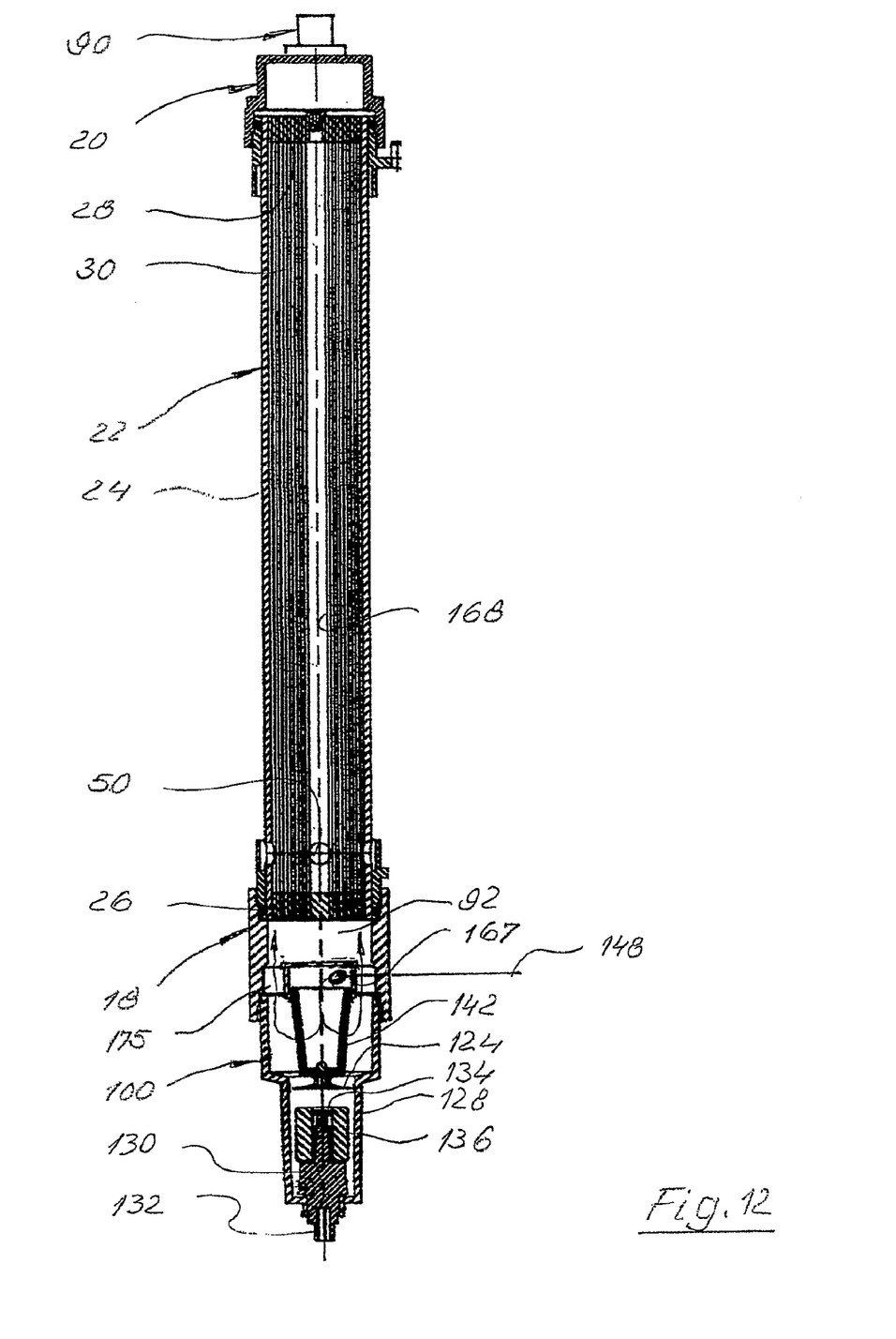
FIG. 12: shows a similar view to FIG. 7, showing another exemplary embodiment, in which a coalescent filter has a throughflow from the outside inwards; and, FIG. 13: shows a similar view to FIG. 12, showing a further modified exemplary embodiment, in which the flow against the coalescent filter takes place rotationally symmetrically.

Such a dryer unit is shown in FIG. 12. Components which have already been discussed are again provided with the same reference symbols and are not described again. The carrying ring 167 for the retaining filter 142 made of hydrophobic sintered material is closed at its upper end, and the inlet 148 opens out tangentially in the circumferential wall of the carrying ring 167. The carrying ring 167 is now suspended on the head piece 18 via holding arms 175 distributed in the shape of a star. In this way, the retaining filter 142 can have a throughflow from the inside outwards, as indicated by arrows.

Figure 13:
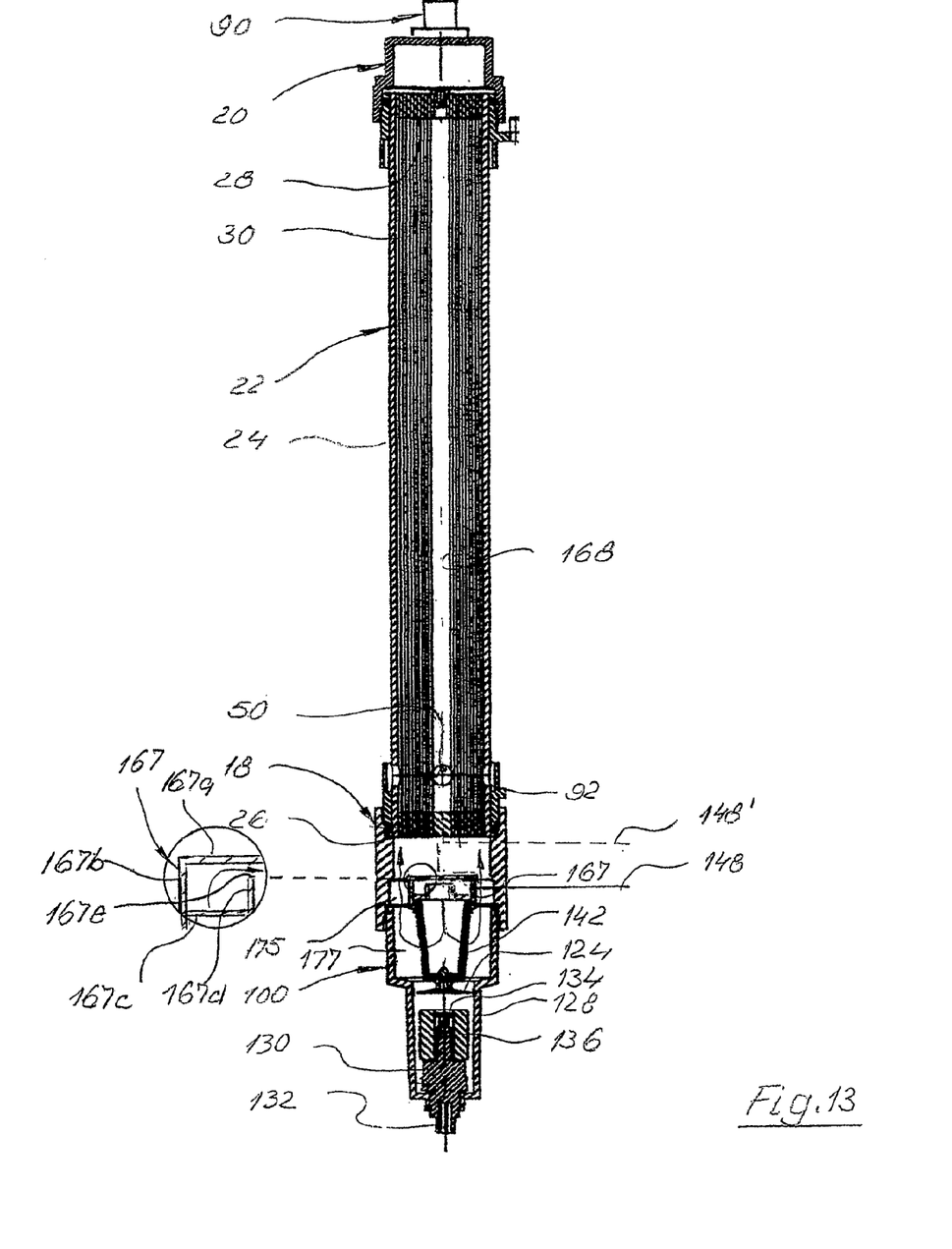

In the exemplary embodiment according to FIG. 13, it is ensured that no rotary motion (swirling) of the arriving air flow is obtained in the interior of the coalescent filter 142. For this purpose, the air is fed in rotationally symmetrically.

To achieve this, the carrying ring 167 is designed as a rotationally symmetrical box part. It has an upper end wall 167a, an outer circumferential wall 167b and an annular bottom wall 167c, from which an inner circumferential wall 167d runs back upwards again. This wall ends a short distance below the end wall 167a, and thus forms an annular feeding gap 167e with the latter.

The air to be treated which is supplied via the inlet 148 thus flows as a rotationally symmetrical curtain in the radial inward direction and changes into a rotationally symmetrical axial air flow, as illustrated schematically. There is thus no cyclone effect in the interior of the coalescent filter.

For connection to the coalescent filter 142, the carrying ring 167 has a skirt 167e.

Instead of designing the carrying ring 167 as a box section, the air may also be supplied to the carrying ring 167 axially, as illustrated at 148' in FIG. 13.

The invention has been explained above using the example of the drying of compressed air. Of course, the invention is equally applicable to the separation of other gas mixtures using hollow-fibre membranes.

It is again emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the spirit of the invention and the scope of protection is only limited by the accompanying claims.

The invention claimed is:

1. A dryer unit for compressed air and other gaseous media comprising:
   a housing, which has an inlet for air to be dried and an outlet for dried air,
   an exchanger unit, which has a multiplicity of hollow membrane fibers, the ends of which are fixed, open, in two holding plates which, together with the housing, delimit a single inlet-side head space and an outlet-side head space, and, a purging air space, connected to the outer surfaces of the membrane fibers, having a purging air inlet and a purging air outlet and being charged with part of the dried air,
   wherein a coalescent filter is connected upstream of the inlet-side head space, and the coalescent filter has a through flow from the inside outwards and is arranged co-axial with the exchanger unit,
   wherein the air to be dried is guided through an inside of the hollow membrane fibers, wherein a pressure at an outside of the hollow membrane fibers corresponds to atmospheric pressure, wherein moisture is moved from the inside of the hollow membrane fibers to the outside of the hollow membrane fibers and, after leaving the coalescent filter, air is guided parallel to a longitudinal axis of the housing or a longitudinal axis of the hollow membrane fibers.

2. The dryer unit of claim 1, wherein the exchanger unit comprises a dryer cartridge, having a core space which is free from membrane fibers and axially extends towards the coalescence filter.

3. The dryer unit of claim 1, wherein the coalescent filter is arranged on the lower end of the housing.

4. The dryer unit of claim 1, wherein a drip element falling away radially outwards is provided at a lower end of the coalescent filter.

5. The dryer unit of claim 4, wherein the drip element is placed on the lower end of the coalescent filter in a vertically displaceable manner.

6. The dryer unit of claim 1, wherein the housing includes three main units: an inlet-side head piece, an outlet-side head piece and an elongated housing part lying there between and surrounding a dryer cartridge which comprises the arrangement of membrane fibers and the membrane fiber holding plates.

7. The dryer unit of claim 2, wherein the dryer cartridge has a sleeve-shaped cartridge housing, at the ends of which the two holding plates are attached in fluid tight manner.

8. The dryer unit of claim 7, wherein the sleeve-shaped cartridge housing has two purging air openings which are axially spaced and adjacent to the cartridge ends, and which are in each case formed as sets of openings distributed in the circumferential direction.

9. The dryer unit according of claim 6, wherein the head pieces and the middle housing part are detachably connected to one another.

10. The dryer unit of claim 9, wherein connecting rings are provided at the junctions between the head pieces and the middle housing part or segments of the middle housing part.

11. The dryer unit of claim 10, wherein at least one of the connecting rings forms a passage to the outside of the housing.

12. The dryer unit of claim 10, wherein at least one of the connecting rings simultaneously constitutes a supporting ring for a sealing ring, via which the dryer cartridge is sealed off from the housing.

13. The dryer unit of claim 12, wherein the outlet-side end of the dryer cartridge is sealed off from the housing by two spaced sealing rings and the space lying axially between the two sealing rings is connected to the outlet-side head space via a throttle.

14. The dryer unit of claim 1, wherein the purging air inlet comprises a central purging air feed channel or an annular purging air feed channel.

15. The dryer unit of claim 1, wherein there are provided means which lead the air to be treated substantially rotationally symmetrically onto the rotationally symmetrical coalescent filter.

16. The dryer unit of claim 1, wherein a chamber lying on the exit side of the coalescent filter is configured in such a way that the flow rate of the air in it is reduced.

17. The dryer unit of claim 15, wherein supply of the air by the air leading means is in axial direction.

18. The dryer unit of claim 1, wherein the coalescence filter has the shape of a conical cup.

19. The dryer unit of claim 1, further comprising a cyclone having a wall with a lower end and a drip element falling away radially outwards at the lower end of the cyclone wall.

20. The dryer unit of claim 19, wherein the drip element is placed on the lower end of the cyclone wall in a vertically displaceable manner.

* * * * *